(12) United States Patent
Gopinath et al.

(10) Patent No.: US 11,325,113 B2
(45) Date of Patent: May 10, 2022

(54) PHOTOSTABLE COMPOSITE FOR SOLAR WATER SPLITTING AND PROCESS FOR THE PREPARATION THEREOF

(71) Applicant: Council of Scientific & Industrial Research, New Delhi (IN)

(72) Inventors: Chinnakonda Subramanian Gopinath, Pune (IN); Raja Ambal Sivaraman, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 468 days.

(21) Appl. No.: 14/895,476

(22) PCT Filed: Jun. 3, 2014

(86) PCT No.: PCT/IN2014/000376
§ 371 (c)(1),
(2) Date: Dec. 2, 2015

(87) PCT Pub. No.: WO2014/195974
PCT Pub. Date: Dec. 11, 2014

(65) Prior Publication Data
US 2016/0136631 A1    May 19, 2016

(30) Foreign Application Priority Data
Jun. 3, 2013 (IN) .......................... 1664/DEL/2013

(51) Int. Cl.
*B01J 23/08* (2006.01)
*B01J 35/00* (2006.01)
(Continued)

(52) U.S. Cl.
CPC .......... *B01J 35/004* (2013.01); *B01J 23/002* (2013.01); *B01J 23/08* (2013.01); *B01J 27/24* (2013.01);
(Continued)

(58) Field of Classification Search
CPC . B01J 23/002; B01J 23/08; B01J 23/07; B01J 27/24; B01J 35/004; B01J 37/03;
(Continued)

(56) References Cited

U.S. PATENT DOCUMENTS 8,853,685 B2   10/2014   Nomura et al.
8,894,825 B2   11/2014   Yamazaki
(Continued)

OTHER PUBLICATIONS

Kumiko Kamata et al. (Synthesis and photocatlytic activity of gallium-zinc-indium-mixed oxynitride for hydrogen and oxygen evolution under visible light. Jan. 2009, cited in IDS) (Year: 2009).*
(Continued)

*Primary Examiner* — Smita S Patel
(74) *Attorney, Agent, or Firm* — Dinsmore & Shohl, LLP

(57) ABSTRACT

The present invention discloses photostable composite of indium gallium nitride and zinc oxide for solar water splitting, comprising Indium content in the range of 1-40 wt %, Ga content in the range of 1 to 15 wt %, nitrogen content in the range of 0.1 to 5 wt %, and the remaining is ZnO. The combustion synthesis comprises the steps of: (a) dissolving 45 to 55 wt % urea, 75 to 80 wt % Zinc nitrate, 3 to 5 wt % Gallium nitrate, and 15 to 20 wt % Indium nitrate in water with stirring until a homogenous solution is formed; and (b) heating the homogenous solution of step (a) at a temperature in the range of 450-550 [deg.]C. for period in the range of 2 to 20 min to obtain the photostable composite.

4 Claims, 9 Drawing Sheets

(51) Int. Cl.
*C01B 3/04* (2006.01)
*C04B 35/58* (2006.01)
*C04B 35/626* (2006.01)
*C04B 35/453* (2006.01)
*C01B 21/06* (2006.01)
*B01J 23/00* (2006.01)
*C01G 9/02* (2006.01)
*B01J 37/08* (2006.01)
*B01J 37/03* (2006.01)
*B01J 27/24* (2006.01)

(52) U.S. Cl.
CPC ............... *B01J 37/03* (2013.01); *B01J 37/08* (2013.01); *B01J 37/088* (2013.01); *C01B 3/042* (2013.01); *C01B 21/0602* (2013.01); *C01B 21/0632* (2013.01); *C01G 9/02* (2013.01); *C04B 35/453* (2013.01); *C04B 35/58* (2013.01); *C04B 35/6267* (2013.01); *C04B 35/62675* (2013.01); *B01J 2523/00* (2013.01); *C01P 2002/50* (2013.01); *C01P 2002/72* (2013.01); *C01P 2002/82* (2013.01); *C01P 2002/84* (2013.01); *C01P 2002/85* (2013.01); *C01P 2002/89* (2013.01); *C01P 2004/04* (2013.01); *C04B 2235/3284* (2013.01); *C04B 2235/3286* (2013.01); *C04B 2235/443* (2013.01); *Y02E 60/36* (2013.01)

(58) Field of Classification Search
CPC ...... B01J 37/088; B01J 37/08; B01J 2523/00; B01J 2523/27; B01J 2523/32; B01J 2523/33; Y02E 60/36; Y02E 60/30; Y02E 60/364; C04B 2235/3284; C04B 2235/3286; C04B 2235/443; C04B 35/6267; C04B 35/62675; C04B 35/453; C04B 35/58; C01P 2004/04; C01P 2002/72; C01P 2002/82; C01P 2002/85; C01P 2002/84; C01P 2002/89; C01P 2002/50; C01B 21/0632; C01B 21/06202

See application file for complete search history.

(56) References Cited

U.S. PATENT DOCUMENTS

| 2012/0152728 | A1 | 6/2012 | Yamazaki | |
| 2012/0292618 | A1* | 11/2012 | Nomura | C25B 1/003 257/43 |
| 2013/0240348 | A1* | 9/2013 | Mi | H01L 31/03044 204/157.5 |
| 2014/0117286 | A1* | 5/2014 | Jun | C09K 11/025 252/301.6 S |

OTHER PUBLICATIONS

Kamata et al., "Synthesis and Photocatalytlc Activity of Gallium-Zinc-Indium Mixëd Oxynitride for Hydrogen and Oxygen Evolution under Visible Light," *Chem. Phys. Lett.* (2009), 470(1-3):90-94, Elsevier B.V.

Mapa et al., "Electronic Structure and Catalytic Study of Solid Solution of GaN in ZnO," *Chem. Mater.* (2009), 21(13):2973-2979, American Chemical Society.

Mapa et al., "Structure, Electronic Structure, Optical, and Dehydrogenation Catalytic Study of $(Zn_{1-z}In_z)(O_{1-x}N_x)$ Solid Solution," *Chem. Mater.* (2010), 22(2):565-578, American Chemical Society.

* cited by examiner

PHOTOSTABLE COMPOSITE FOR SOLAR WATER SPLITTING AND PROCESS FOR THE PREPARATION THEREOF

CROSS-REFERENCE TO RELATED APPLICATIONS

This application is a 35 USC § 371 National Stage application of International Application No. PCT/IN2014/000376 filed Jun. 3, 2014, now pending; which claims the benefit under 35 USC § 119(a) to India Application No. 1664/DEL/2013 filed Jun. 3, 2013. The disclosure of each of the prior applications is considered part of and is incorporated by reference in the disclosure of this application.

FIELD OF THE INVENTION

The present invention relates to photostable composite of indium gallium nitride and metal oxide preferably Zinc oxide for solar water splitting. Particularly, present invention relates to simple, one step and reproducible process for preparation of photo stable composites of Indium Gallium Nitride in metal oxide, with enhanced absorption property.

BACKGROUND OF THE INVENTION

The search for alternate renewable resources gain prime research interest nowadays to meet undeniable energy demand by exponentially increasing population and also to surpass the alarming environmental issues at global level. Utilization of freely available solar energy source of which annual recovery of 0.1% can be sufficient to fulfill world energy needs throughout the year in a cost effective way is one way of satisfying global energy demands. Using solar energy and generation of hydrogen from water splitting have been keenly concerned as 'Holy Grail' problems of science since hydrogen is an attractive clean fuel with the highest energy density. Another ongoing active research is on development of solar cells for converting solar power into electrical power to tap sunlight apparently. Catalytically potential metal oxides such as $TiO_2$, ZnO, $SrTiO_3$, $NaTiO_3$, $TaO_2$ are extensively explored for hydrogen generation from water splitting process as well as photocurrent generation with the aid of nanosized noble metal co catalysts and among them $TiO_2$ and ZnO remain as the most attractive oxides for their versatility.

ZnO is well known semiconductor being attracted in research for many decades for its exuberant properties, and is also well known to be used in N (as nitride, $N^{3-}$) doped form, which overcomes some of its drawbacks such as photo corrosion and visible light activity. Nevertheless, achieving nitrogen doping with reproducibility and considerable solubility of nitrogen in ZnO remains a critical problem for decades. The present inventors, had succeeded in nitrogen doping with highest solubility content through solution combustion method, but nitride type of nitrogen doping which is of prime importance for p-type conductivity and photo stability in ZnO has not been achieved so far.

To increase nitrogen solubility with nitride type and to compensate the charges, high nitrogen affinity group III metals like Al, Ga, In are usually co-doped in ZnO. Due to the structural similarity with matching lattice parameters between corresponding nitrides and ZnO enable formation of solid solutions that are indispensable for tunable band gap engineering.

GaN:ZnO solid solution prepared through nitridation method is exclusively studied for water splitting reactions under visible light since a notable band gap reduction can be distinguished from respective parent material (*J. Am. Chem. Soc.* 2005, 127, 8286-8287). Despite its interesting optoelectronic properties, the material is attenuated to produce hydrogen without noble metal co-catalyst due to persisting defect densities.

The preparation of InN:ZnO and GaN:ZnO solid solutions by the combustion method has been disclosed by Gopinath et at earlier, in *Chem. Mater.* 2010, 22, 565-578 and *Chem. Mater.*, Vol. 21, 2973-79 (2009), respectively. However, the visible light absorption of this material did not cover the complete solar spectrum.

Domen et at (*Chem. Phys. Lett.,* 2009, 470, 90-94) claimed to synthesize solid solution of InGaN in ZnO in order to enhance visible light absorption but they were unsuccessful in achieving true solid solution. Rather oxynitride of the above material was prepared with negligible water splitting activity, even in the presence of noble metal co-catalyst.

Thus, while Indium Gallium nitride is a promising material in solar harvesting field as its tunable absorption can cover entire visible light region of solar spectrum, in addition to regular UVA and UVB ranges absorbed by many common semiconductors, such as $TiO_2$; nevertheless its synthesis in different forms by simple viable processes remains a bottleneck in this field of technology. Further, the issue of photo stability of zinc oxide continues to be an unresolved problem.

OBJECTS OF THE INVENTION

Main object of the present invention is to provide photo stable composites of Indium Gallium Nitride in metal oxide, preferably Zinc oxide useful as light harvester for solar hydrogen production from water splitting and other photocatalytic reactions.

Another object of the present invention is to provide simple, one step and reproducible process for preparation of photo stable composites.

SUMMARY OF THE INVENTION

Accordingly, the present invention provides a photostable composite of Indium gallium nitride (InGaN) in ZnO, comprising Indium content in the range of 1-40 wt %, Ga content in the range of 1 to 15 wt %, nitrogen content in the range of 0.1 to 5 wt %, and the remaining is ZnO.

In an embodiment of the present invention the nitrogen present in the photostable composite is in the form of nitride.

In yet another embodiment of the present invention, the composite is in the form of a solid solution as embedded quantum dots.

In yet another embodiment of the present invention, the photostable composite exhibits absorption in the entire solar spectrum.

In yet another embodiment of the present invention, said composite exhibits hydrogen evolution in the range of 5 to 65 µmol/h g.

In an embodiment of the present invention the photostable composition is provided for use as light harvester for production of hydrogen from water splitting, photocatalytic reaction, and photocurrent generation.

In another embodiment, present invention provides a process for the synthesis of the photostable composite as claimed in claim 1, comprising the steps of:

(a) dissolving 45 to 55 wt % urea, 75 to 80 wt % Zinc nitrate, 3 to 5 wt % Gallium nitrate, and 15 to 20 wt %

Indium nitrate in water with stirring until a homogenous solution is formed; and (b) heating the homogenous solution of step (a) at a temperature in the range of 450-550° C. for period in the range of 2 to 20 min to obtain the photostable composite.

In yet another embodiment of the present invention, the molar ratio of urea to nitrate salts of Zinc, Gallium, and Indium hydrates is in the range 4.5-5.5.

In another embodiment of the present invention, the molar ratio of urea to nitrate salts of Zinc, Gallium, and Indium hydrates is 5.

In yet another embodiment of the present invention, the composite is in the form of a solid solution as embedded quantum dots.

BRIEF DESCRIPTION OF ACCOMPANYING DRAWINGS

FIG. 1 depicts wide angle X-ray diffraction for confirming solid solutions. FIG. 1(a) depicts comparative diffraction patterns of standard ZnO bulk powder and the composites prepared by the process of instant invention. FIG. 1(b) relate to Extended XRD pattern according to exemplary embodiment provided herein.

Figure 4:
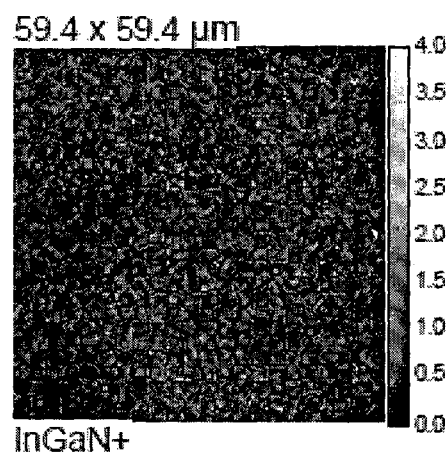
Figure 4:
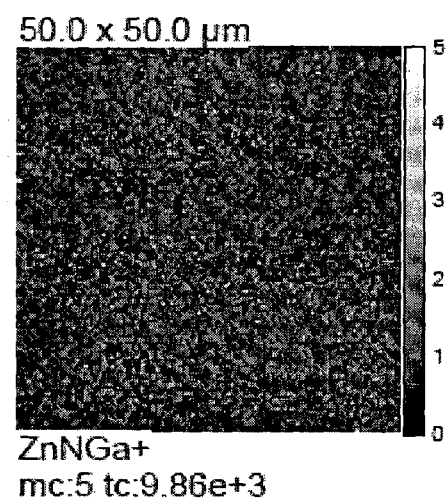
Figure 4:
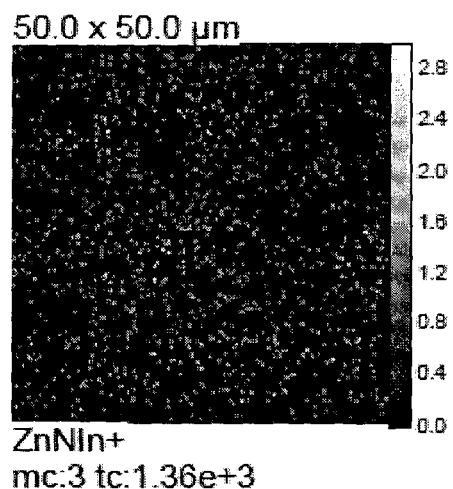

FIG. 4 depicts the Secondary ion mass spectroscopy (SIMS) using $Bi^{3+}$ primary ion source. The numerical scales and associated colors against every image denote the range of particular secondary ion intensity per pixel and the corresponding mass spectroscopy with considerable detection counts ensures its availability in solid solution. FIG. 4(a) relates to mapping highlighting the presence of InGaN species predominantly and its homogenous distribution throughout the surface. FIG. 4(b), FIG. 4(c) relate to mapping of the fragments Zn—N—Ga and Zn—N—In according to exemplary embodiment provided herein.

Figure 5:
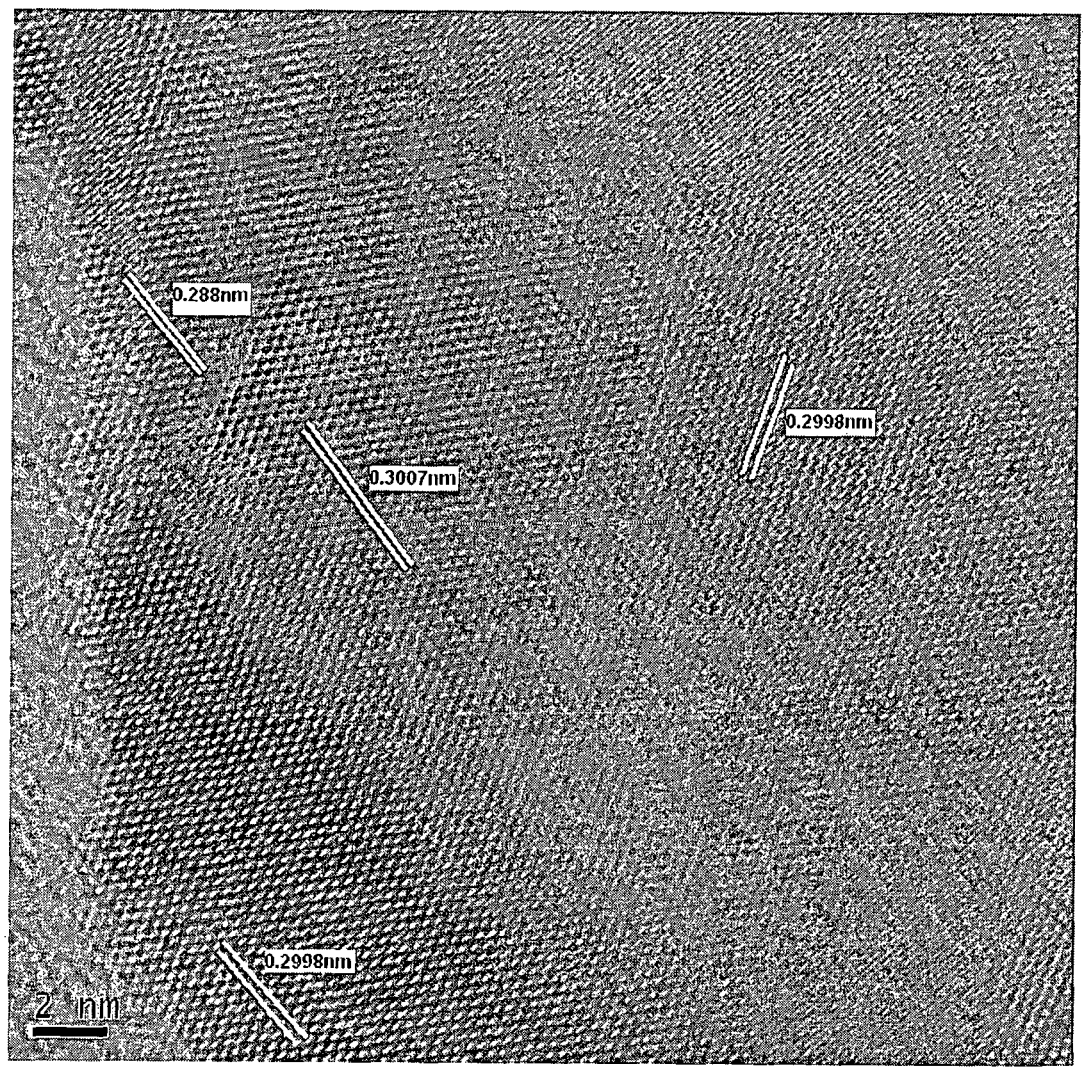

FIG. 5 relate to HRTEM image: It show high resolution lattice planes of material designated as In5Ga8 according to exemplary embodiment provided herein.

Figure 6:
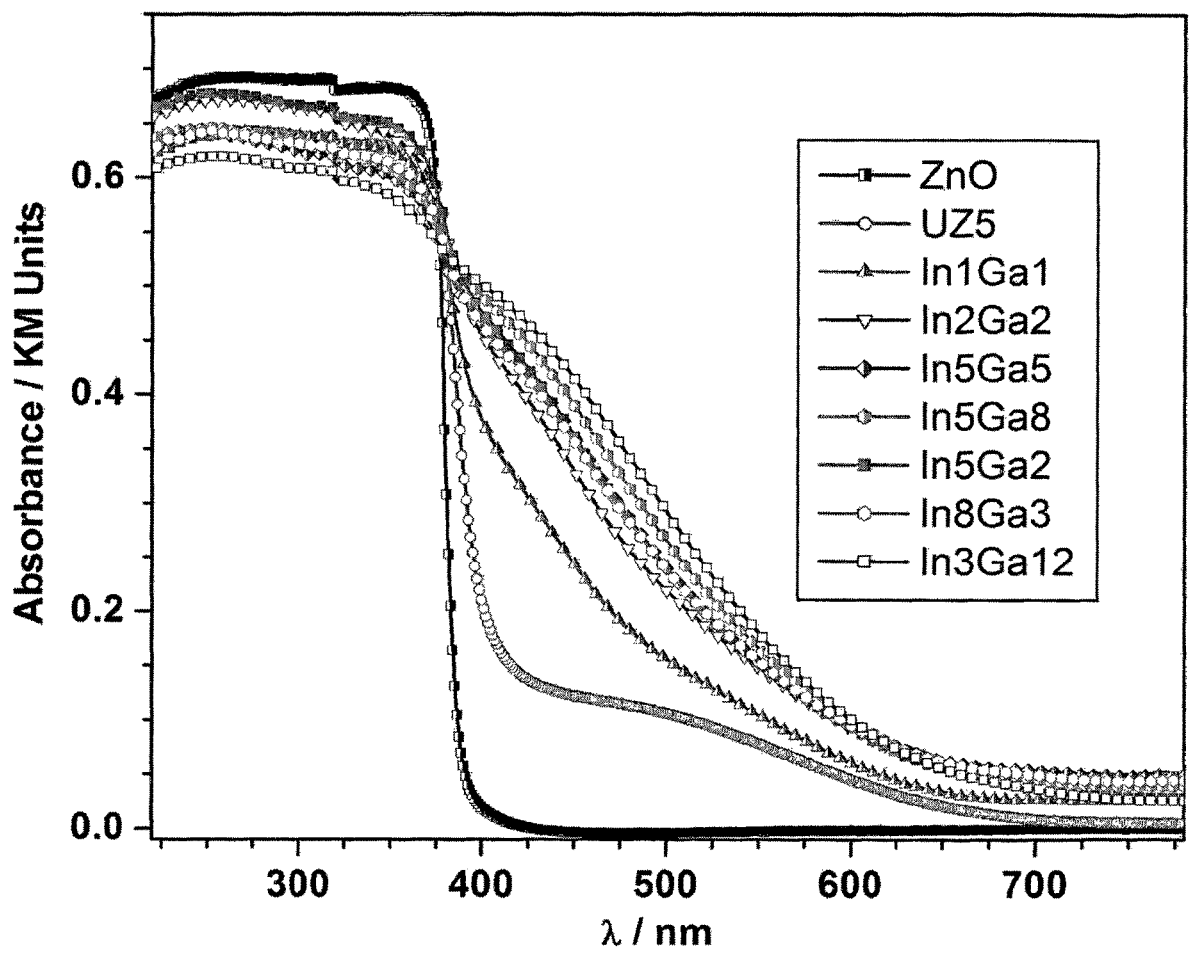

FIG. 6 relate to comparative: UV-visible absorption spectra of the new composite solid solutions along with and the standard ZnO according to exemplary embodiment provided herein. The inset shows the fill area of absorption regime of one solid solution designated as In5Ga5.

Figure 7:
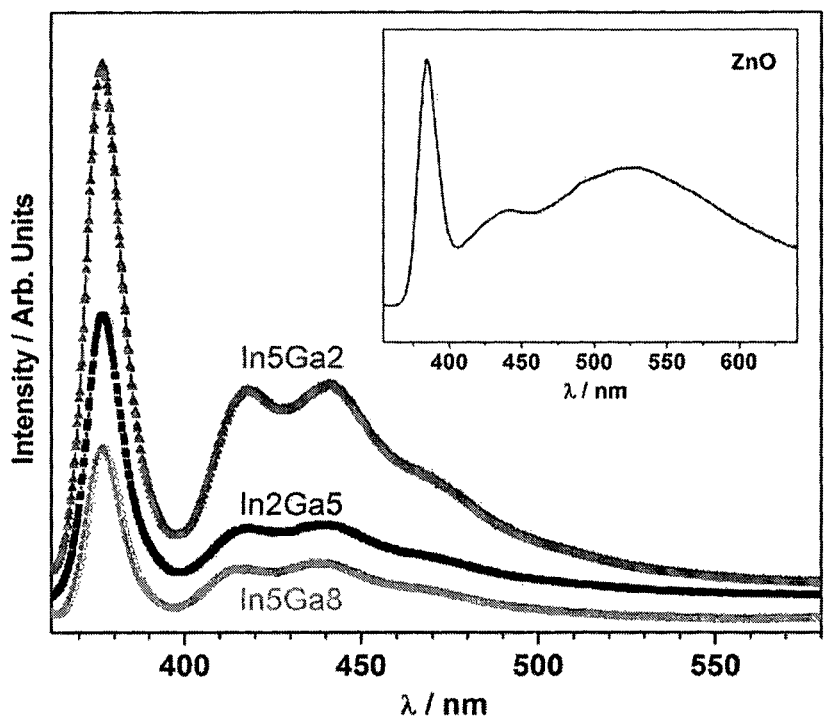

FIG. 7 depict emission spectra of the composite and parent ZnO according to exemplary embodiment provided herein.

Figure 8:
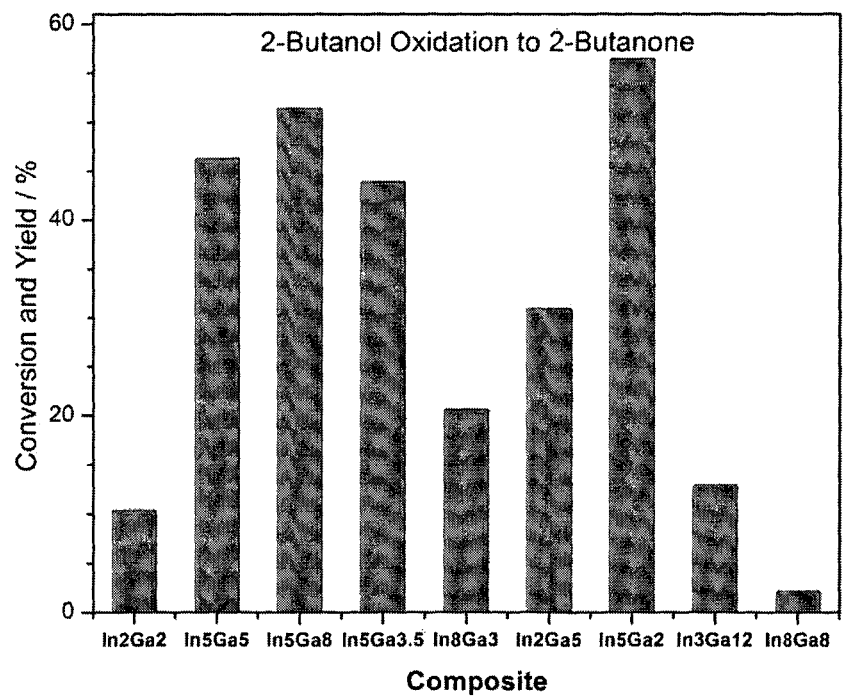

FIG. 8 depict Photocatalytic activity of composite In5Ga8 in visible light for photocatalytis oxidation of 2-butanol to 2-butanone, according to exemplary embodiment provided herein.

Figure 9:
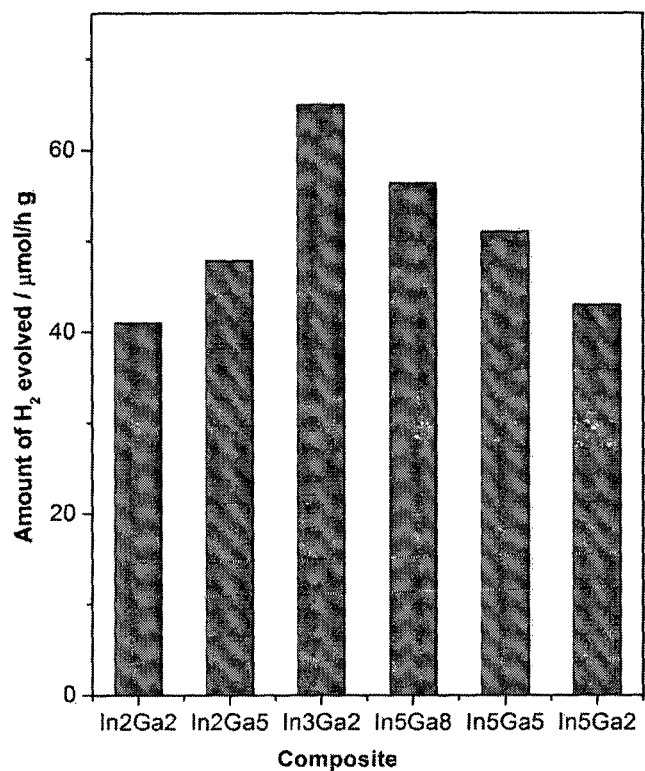

FIG. 9 depicts Rate of photocatalytic hydrogen evolution activity as the function of composite according to exemplary embodiment provided herein.

Figure 10:
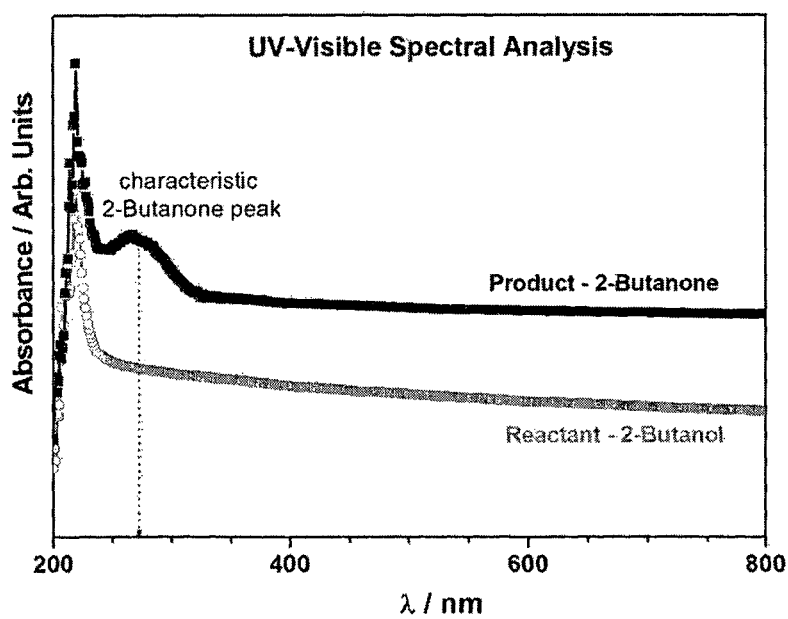

FIG. 10 depict UV spectrum of methyl ethyl ketone obtained by photocatalytic oxidation of 2-butanol.

Figure 11:
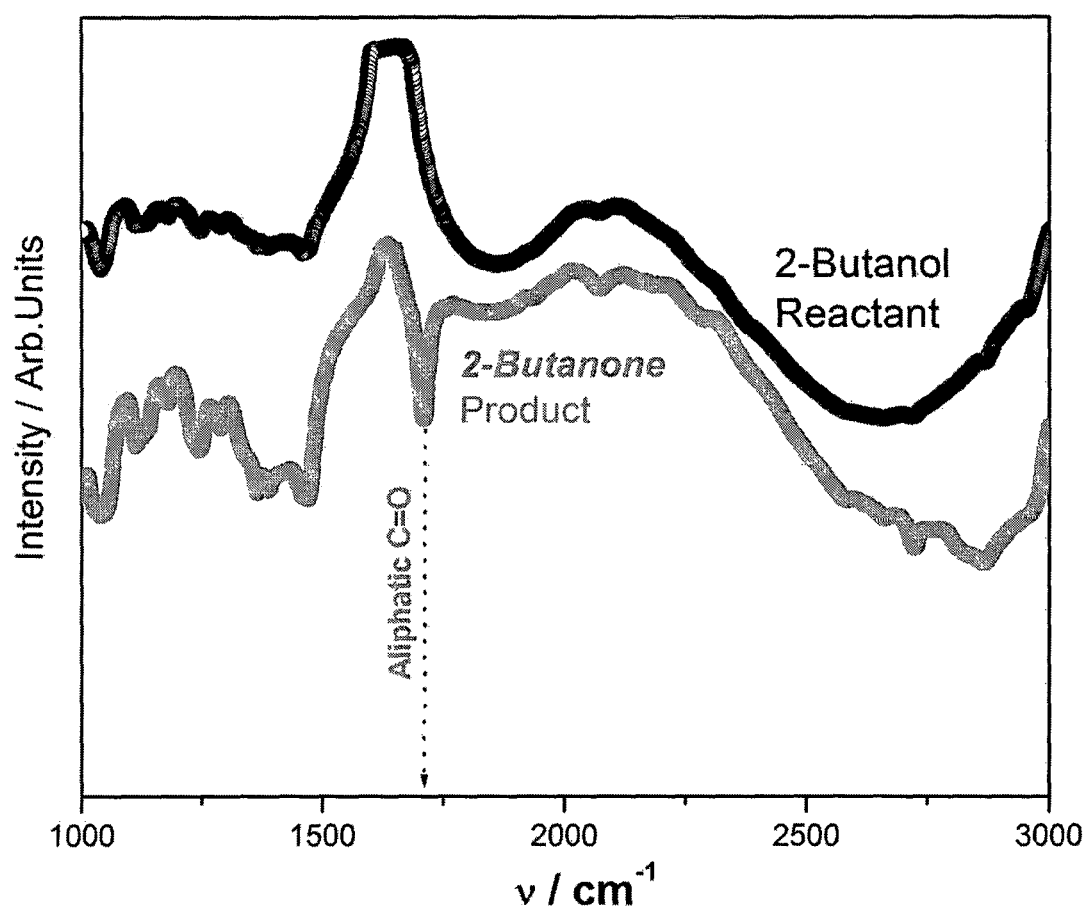

FIG. 11 depict IR spectrum of methyl ethyl ketone obtained by photocatalytic oxidation of 2-butanol.

FIG. 12(a) Linear sweep voltammograms to demonstrate photocurrent generation from InGaN@ZnO and ZnO under 20 mW $cm^{-2}$ irradiation ($\lambda$=380-770 nm with visible bandpass (VBP) filter) and dark scan of ZnO at the scan rate of 10 mV/S in the sweeping potential range from −0.5 to 0.5 eV, through zero voltage. Chronoamperometry measurements carried out under zero voltage (0 V) and the results given for representative materials in (b) In5Ga8, and (c) In5Ga5 with different cut-off wavelength filters and the cut off $\lambda$ is given in the figure.

DETAILED DESCRIPTION OF THE INVENTION

The present invention provides photo stable composites of Indium Gallium Nitride in metal oxide, preferably Zinc oxide, useful as light harvester for solar hydrogen production from water splitting and other photocatalytic reactions comprising:

(a) dissolving urea and requisite amounts of nitrate salts of Zinc, Gallium, and Indium in water, stirring until a homogenous solution is formed; and (b) heating the homogenous solution of step (a) in a muffle furnace at a temperature in the range of 450-550° C. to obtain the composite.

The present invention also provides a simple, one step, reproducible process for synthesis of photostable composite of Indium Gallium nitride integrated uniformly in the metal oxide, preferably zinc oxide.

The photostable composites of Indium Gallium nitride in zinc oxide obtained by the process of present invention can be in the form of solid solution, as embedded quantum dots and such like. The nitrogen present in the composite is in nitride form.

The said photostable composite is useful as light harvester for solar hydrogen production from water splitting and other photocatalytic reactions as the composite material exhibits extensive light absorption spanning entire uv-visible absorption spectrum. The composite material retains the wurtzite structure and that the light harvesting components such as Ga, In and catalytically active components such as ZnO are the integral parts of single phase structure which determines the photocatalytic behavior of the composite.

The present invention relates to the use of photostable Indium Gallium nitride embedded quantum dots in ZnO as light harvester, wherein said photostable composite shows absorption in the entire solar spectrum, for production of hydrogen from water splitting without the use of any sacrificial agent or a co-catalyst and in other photocatalytic reactions.

The photostable composite of Indium Gallium nitride embedded quantum dots in ZnO serve as light harvester for solar hydrogen production from water splitting and eliminates the need for use of any sacrificial agent (organic donors) or any costly noble metal containing co-catalyst. They can be used under UV irradiation of wavelength ≥455 nm.

In the process, the Urea to Indium, Zinc and Gallium nitrate is in the molar ratio ranging between 4.5-5.5; preferably 5.

The metal oxide, zinc oxide used in the instant invention is photo stable, does not corrode when exposed to solar spectrum and/or UV light alone, and is efficient in the whole range of solar spectrum.

Figure 1A:
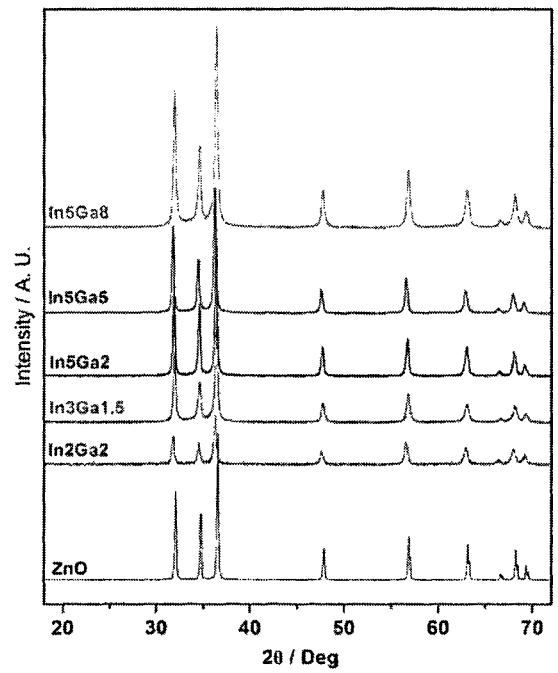
Figure 1B:
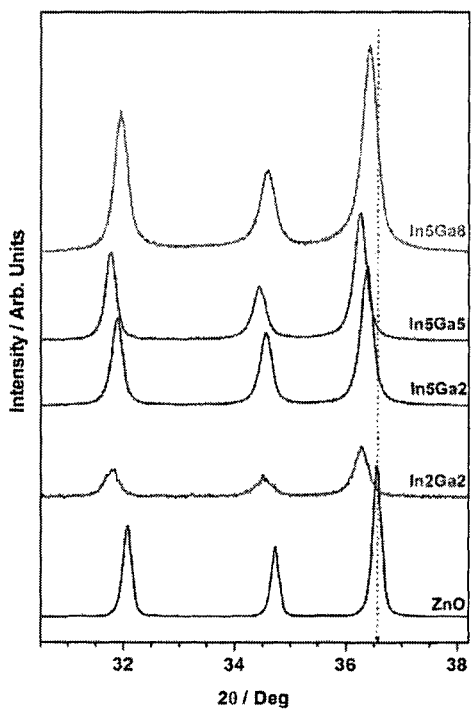

As shown in FIG. 1, identical intense diffraction pattern of Indium Gallium nitride in zinc oxide with that of standard ZnO signifies the high quality wurtzite structure with high degree of crystallinity. Further, as shown in FIG. 1(b), notable peak shift is observed in all of the peaks of the photostable material indicating the incorporation of other elements such as In, Ga and N in the ZnO lattice. Absence of new peaks at 31°, 22° for $In_2O_3$ and $Ga_2O_3$ respectively, underscores the single phase purity in the represented compositions with In precursor content (≤8%). The results signify the viability of solution combustion process of the present invention.

Figure 2:
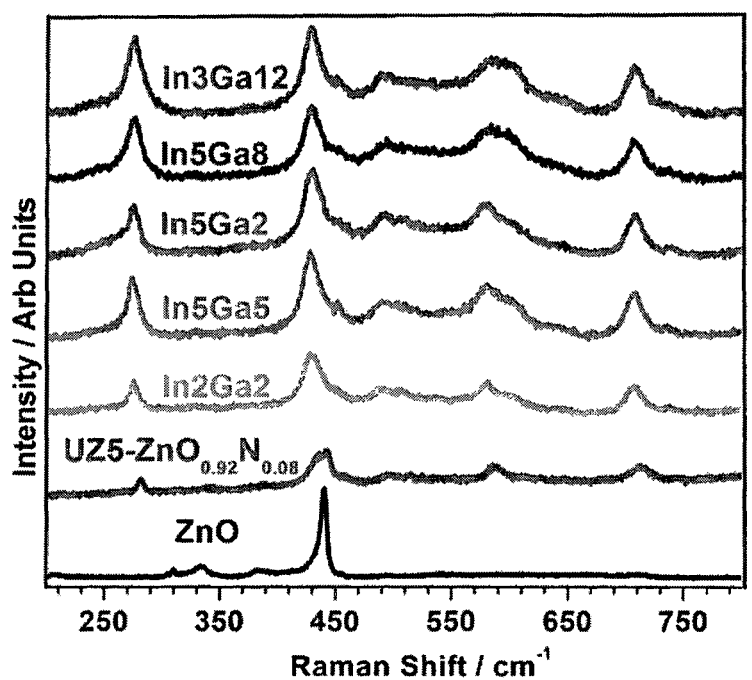
FIG. 2 depicts comparative: Raman spectra of the composites are furnished along with and standard ZnO according to exemplary embodiment provided herein.

As shown in FIG. 2, the prominent peak at 458 $cm^{-1}$ of ($E_2$ high) which is a band characteristic of wurtzite phase in all materials of selected compositions and also standard ZnO reveals the retention of wurtzite phase that is corroborated with XRD result Further, peak at 582 $cm^{-1}$ which has contributions from $E_2$ high mode of Zn—N, Ga—N and In—N give rise to more broad nature comparatively to other peaks. Another new peak at 734 $cm^{-1}$ is assigned to $A_1$ (LO) mode of Ga—N bond. The peaks found at 273 $cm^{-1}$ and 642 $cm^{-1}$ arise because of the local vibration modes (LVMs) of Zn—N modes which reveals that nitrogen is substitutionally doped at oxygen site in the ZnO lattice. The observation outweighs the possibilities of existence of N—O species and antisite N doping that can demerit structural intact ability. Further, coinciding with SIMS (FIG. 4), HRTEM (FIG. 5) strongly confirms the formation of In—N—Ga quantum dots embedded in ZnO.

The secondary ion mass spectrometry (SIMS) using $Bi^{3+}$ primary ion source, as depicted in FIG. 4, ensures the formation of photostable composite material in solid solution form. The homogeneous distribution of In—Ga—N fragments (species) throughout the surface as depicted in FIG. 4a and the mapping of the fragments Zn—N—Ga and Zn—N—In as seen from FIG. 4(b) and FIG. 4(c) respectively reveals the presence of quantum dots in bulk also. Further, FIG. 4(b) and FIG. 4(c) disclose the nitride linkages in the photostable composite.

With reference to FIG. 5, the HRTEM of material designated as In5Ga8 shows images with two different contrast lattice plane in which the center of the lattice plane is identified as In—N by its d spacing 0.3007 Å. On moving to the edges and near edges of the same lattice plane (on the right side to the text 0.3007 Å in FIG. 5), it is seen to be exhibiting the d spacing corresponding to In—N—Ga 0.298 Å. Moving to the other contrast in the same lattice plane (top left to the text 0.3007 Å in FIG. 5), d spacing value changes to 0.282 A, corresponding to ZnO. Thus, analysis of FIG. 4 and FIG. 5 reveals the formation of In—N—Ga quantum dots embedded in ZnO.

With reference to FIG. 6, the extensive absorption of the composite material spanning entire UV-visible absorption spectrum emphasizes its use in solar harvesting. The absorption band edge of parent ZnO onsets around 375 nm, whereas the solid solutions show absorption onset around 720 nm and there is concomitant increase in absorption with increase in nitride content. The enhanced absorption of solid solutions covers entire visible light region and marginal absorbance is observed beyond 720 nm. The present inventors attribute the highest absorbance values in the visible light range to high absorption cross section of quantum dots of In—N—Ga.

Figure 3:
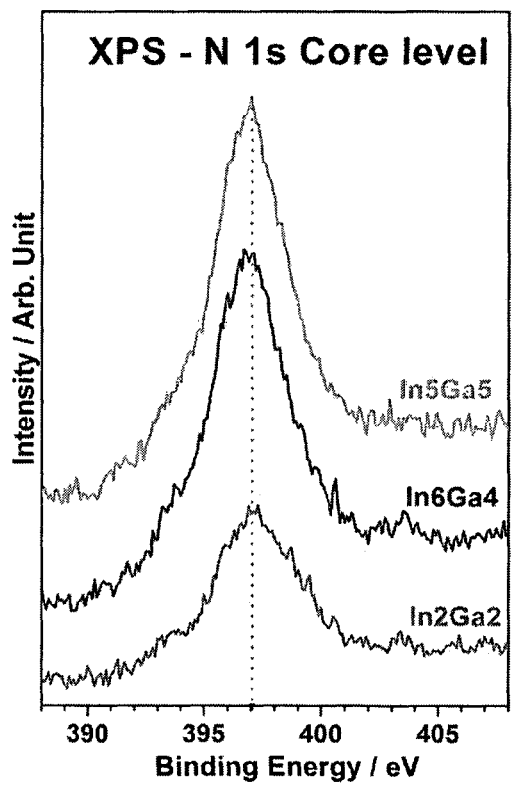
FIG. 3 depicts the x-ray photoelectron spectra (XPS) of nitrogen 1s (N 1s) core levels of composite revealing nitrogen doping in nitride form of the composite according to exemplary embodiment provided herein. 1 s core level is the closest orbital to the nucleus, and different states of nitrogen (such as nitride, nitrate) show characteristic difference in binding energy.

As evidenced in FIG. 3 and FIG. 7, nitrogen doping is in nitride form, thus eliminating an oxygen vacancy that suppresses photocorrosion of ZnO. Accordingly, as seen from FIG. 3, a single sharp peak for N1s core level is obtained at 397.1 eV which is assigned to typical nitride $N^{3-}$ corroborating the literature values. Absence of peaks above 401 eV confirms the absence of N—O or $NO_2$ species. Absence of peak at 399 eV corresponds to ammonia type of nitrogen. The result demonstrates the chemical environment of nitrogen bonded to only metals thereby developing high electron density on nitrogen. Therefore, it confirms nitrogen doping in nitride form.

Further, FIG. 7 show near band edge emission around 375 nm along with two new emission sharp peaks centered at 420 nm and 440 nm which are completely absent in parent ZnO. There is huge decrease in the emission intensity of near band edge peak and gradually is shifted to higher wavelength. The new peaks with pronounced intensities are attributed to the transitions between new electronic energy levels formed by N doping in the form of nitride. The intense defect emission due to oxygen vacancies and Zinc interstitials in ZnO centered at 525 nm is completely not observed in solid solutions. Absence of broad green emission peak clearly indicates the suppression of oxygen vacancies, thus eliminating the possibility of photo corrosion.

The photostability of the composite material is evaluated by UV irradiation. Accordingly, continuous light irradiation using strong UV irradiation with 400 watts mercury vapour lamp for 48 hours is conducted. The materials are suspended in methanol aqueous mixture and stirred continuously so as to simulate the reactant conditions. After the completion of irradiation the filtered solution is subjected to inductively coupled plasma (ICP) spectral analysis for detecting Zn ion concentration as tabulated in Table 1 below. When compared with ZnO leaching analysis for which 185 ppm concentration of Zn ion in 6 hours of irradiation is leached out, the solid solution with embedded quantum dots exhibits Zn ion concentration of 1.483 ppm for 48 hours of irradiation indicating significantly suppressed leaching of Zn. The suppression of Zn ion concentration is about 2-3 orders of magnitude for solid solutions revealing extreme photo stability of the new material.

TABLE 1

ICP analysis of the $Zn^{2+}$ ion concentration leached out in the filtered solution after 48 hours of continuous UV irradiation

| Sl. no | Sample code | $Zn^{2+}$ dissolution (ppm) |
| --- | --- | --- |
| 1. | In2Ga5 | 1.961 |
| 2. | In2Ga5 | 3.213 |
| 3. | In5Ga5 | 1.495 |
| 4. | In5Ga8 | 1.814 |
| 5. | ZnO* | 185 |

*ZnO is irradiated for only 6 hours.

Photocatalytic behavior of the composite material highlighting the synergistic operation of light harvesting components and catalytically active components being the integral parts of single phase structure is exemplified in terms of photocatalytic dehydrogenation of 2-butanol into 2-butanone (or methyl ethyl ketone) (FIG. 8).

Interconnection of the quantum dots in ZnO lattice facilitates immediate mediation of charge carriers to the reactant sites. Since the life time of the charge carriers are in the range of femto seconds, it is necessary to transfer the charge carriers immediately to the reactants for the reasonable yield of the product. As evident from elemental mapping and bulk SIMS analysis the quantum dots are distributed throughout the surface and in the bulk. Hence flux of visible light photons can be concentrated by the quantum dots on the surface and the photons can make several passes into the bulk also. The quantum dots are interconnected to ZnO by nitride linkages bringing the light flux in close vicinity to the reaction sites. According to literature reports nitrides are having poor catalytic activity and ZnO also has negligible activity under visible light. However, when the nitrides in form of quantum dot are embedded in ZnO, as in the present structural feature of the composite, the photocatalytic yield of 2-butanone is observed to multiply several times highlighting the synergistic operation of light harvesting components and catalytically active components being the integral parts of single phase structure.

Accordingly, photocatalytic dehydrogenation of 2-butanol into methyl ethyl ketone at ambient conditions is carried under visible light irradiation for about 3 hours using $NaNO_2$ filter for allowing only visible light wavelength above 420 nm. FIG. 8 depicts the yield of methyl ethyl ketone with high selectivity for six different (higher and lower) compositions with the highest yield around 56% for the composition designated as In5Ga8. Despite of ability to adsorb the reactants, Standard ZnO, however, shows negligible yield due to its poor visible light response. Further the product methyl ethyl ketone so formed is confirmed qualitatively by IR and UV experiments. A characteristic peak for aliphatic C=O stretching frequency at 1746 cm-1 in IR spectra and in conjunction to UV spectra showing characteristic absorption peak of 2-butanone is seen.

The aforementioned salient properties of the materials such as enhanced visible light absorption, synergetic operation of the components for catalytic activity, photostability and intense crystallinity accompanied with perfect ordering of the particles to act efficiently as photocatalyst is further illustrated in photocatalytic hydrogen generation from water splitting (FIG. 9).

Accordingly, 30 mg of the composite suspended in 20% methanol solution of 50 ml volume is irradiated with visible light (wavelength≥420 nm). The pH is adjusted to 4.5 and there is no addition of either sacrificial agent or co-catalyst. Considerable hydrogen production on increasing the incident wavelength to 455 nm is observed. Though the energy of the incident photon is decreased, composite material shows activity under visible light irradiation. The outcome of the result demonstrates the potential associated with the composite in absorbing visible light portion of sunlight and simultaneous conversion of light energy into chemical energy as evidenced in FIG. 9 and Table 2. In3Ga2 shows the highest hydrogen production of 65 µmol/h g of catalyst.

TABLE 2

Hydrogen evolution from overall water splitting
Amount of hydrogen evolution is reported for 20 mg of catalyst suspended in 20 mg of composite suspended in water of 40 ml volume with pH adjusted to 4.5 and irradiated under illumination of 300 watts Xenon lamp using a) AM 1.5 filter. For entry 5, 455 nm cut-off filter was employed to demonstrate the activity with low energy photons.

| Sl. no | Sample code | Hydrogen evolution[b] µmol/h g |
|---|---|---|
| 1. | In2Ga5 | 47.73 |
| 2. | In2Ga5 | 36.5 |
| 3. | In3Ga2 | 65.0 |
| 4. | In5Ga8 | 56.3 |
| 5. | In5Ga8 | 42[c] |

[b]Activity is reported using AM. 1.5 filter.
[c]activity is reported using cut-off filter of wavelength of 455 nm.

The photostable Indium Gallium nitride embedded quantum dots in ZnO can be prepared as films on different substrates for optical, electronic, or optoelectronic device or can be used as catalyst to carry out photocurrent generation as in solar cells, photodegradtion of organic pollutants, photocatalytic conversion of organic compounds, for production of hydrogen from water splitting and such like.

Figure 12:
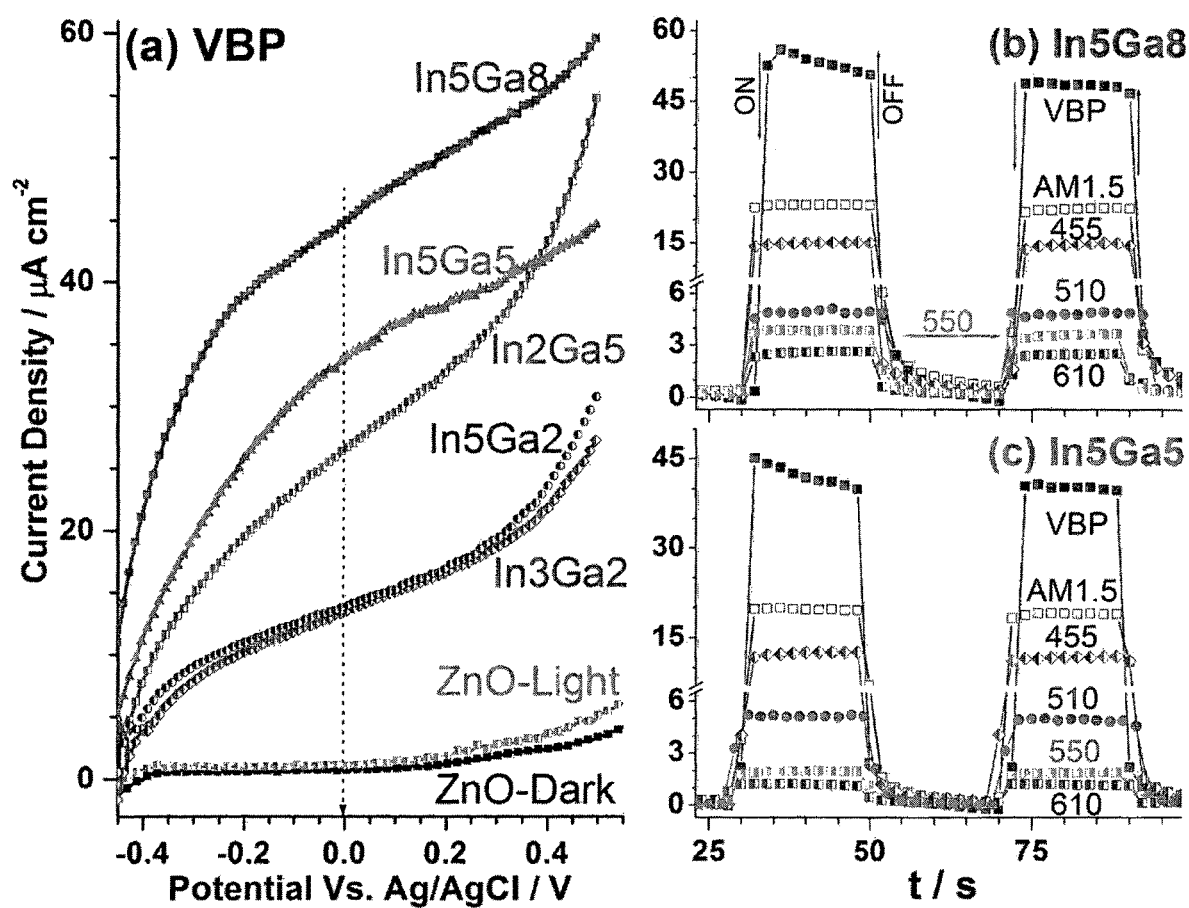

FIG. 12 displays photocurrent generation from InGaN@ZnO composites recorded under visible light irradiation with visible band-pass filter (λ≥400 nm). ZnO furnishes <1 µA/cm², mainly due to absorption by O-defects. However, InGaN@ZnO composites exhibits a dramatic increase in photocurrent generation and the response increases up to 50 µA/cm² at 0 V with a gradual increase in In+Ga content; similarly, photocurrent increase from 25 to 60 µA/cm² at 0.5 V. Photoresponse of InGaN@ZnO lies in the fact of enhanced visible light absorption with notable absorbance values. Hence the visible light photoresponse is solely attributed to InGaN quantum dots due to the above factors. We observed two orders of magnitude enhancement in visible light photocurrent generation at 0 V with InGaN@ZnO than ZnO. Considering ZnO, which is only UV active material, the enhancement in photocurrent for InGaN@ZnO under visible light irradiation at zero bias condition is noteworthy. According to literature reports (*Appl. Phys. Lett.* 2009, 95, 261904), the aspect of visible light absorption by InGaN alone does not show significant photoresponse implying intrinsic nature of poor charge utilization by InGaN. Structurally integrated InGaN with ZnO brings the electronic integration/coupling of light harvesters with fast conducting ZnO. The enhancement is attributed to the fact of synergistic operation of visible light harvesting by InGaN quantum dots and charge carrier conduction by ZnO.

Stable photoresponse is further confirmed by chronoamperometry measurements at 0 V, with different cut-off filters (FIGS. 12(b) and 12(c). Indeed extensive visible light absorption and efficient conversion of light energy into current highlights the potential nature of the materials to act as rainbow solar cells. Current value decreases gradually with increasing cutoff wavelength. Although, the magnitude of photocurrent is small at 610 nm filter, it indicates the effective absorption of high wavelength light underscoring the In-rich nature of InGaN@ZnO. Incident photon conversion efficiency (IPCE) calculated for In5Ga8 varies from 7.5% (VBP), 2.23% (455 nm), 0.75% (510 nm) and 0.52% (610 nm) with different cut off wavelengths given in FIG. 12b.

EXAMPLES

Following examples are given by way of illustration and therefore should not be construed to limit the scope of the invention.

Experimental

Indium nitrate and Gallium nitrate salts are purchased from Sigma Aldrich. Zinc nitrate and urea are purchased from Merck chemicals and used without further purification.

Example 1 to 8

Preparation of Composite of Indium Gallium Nitride in Zinc Oxide by Solution Combustion Method Example 1

Urea to Indium, Zinc and Gallium nitrates molar ratio was kept constant at 5. 94.3 wt % (11.422 g) of Zinc nitrate hexahydrate, 1.7 wt %(0.2044 g) of Gallium nitrate hydrate, 4.0 wt %(0.4812 g) of Indium nitrate hydrate and 12 g of Urea were dissolved in 10 ml of water and stirred constantly until homogenous solution was formed. This homogenous solution was kept inside muffled furnace which was maintained at 500° C. The voluminous combustion process conducted for 10 minutes resulted in fine dark yellow powder. The material is referred to as In2Ga2.

Example 2

Urea to Indium, Zinc and Gallium nitrates ratio was kept constant at 5. 93.64 wt %(11.065 g) of Zinc nitrate hexahydrate, 4.32 wt % (0.51106 g) of Gallium nitrate hydrate, 2 wt %(0.24064 g) of Indium nitrate hydrate and 12 g of Urea were dissolved in 10 ml of water and stirred constantly until homogenous solution was formed. This homogenous solution was kept inside muffled furnace which was maintained at 500° C. The voluminous combustion process conducted for 15 minutes resulted in fine orange yellow powder. The material is referred to as In2Ga5.

Example 3

Urea to Indium, Zinc and Gallium nitrates ratio was kept constant at 5. 90.6 wt % (10.71 g) Zinc nitrate hexahydrate, 4.3 wt %(0.511 g) Gallium nitrate hydrate, 5.1 wt %(0.602 g) Indium nitrate hydrate and 12 g Urea were dissolved in 10 ml of water and stirred constantly until homogenous solution was formed. This homogenous solution was kept inside muffled furnace which was maintained at 500° C. The voluminous combustion process conducted for 15 minutes resulted in fine dark orange powder. This material is referred to as In5Ga5.

Example 4

Urea to Indium, Zinc and Gallium nitrates ratio was kept constant at 5. 81.5 wt %(10.065 g) of Zinc nitrate hexahydrate, 3.43 wt %(0.4244 g) of Gallium nitrate hydrate, 15.06 wt %(1.86 g) of indium nitrate hydrate and 12 g of Urea were dissolved in 10 ml of water and stirred constantly until homogenous solution was formed. This homogenous solution was kept inside muffled furnace which was maintained at 500° C. The voluminous combustion process conducted for 15 minutes resulted in fine reddish orange powder. This material is referred to as In15Ga5.

Example 5

Urea to Indium, Zinc and Gallium nitrates ratio was kept constant at 5. 87.94 wt %(10.352 g) of Zinc nitrate hexahydrate, 6.95 wt %(0.817696 g) of Gallium nitrate, 5.1 wt %(0.6016 g) of Indium nitrate hydrate and 12 g of Urea were dissolved in 10 ml of water and stirred constantly until homogenous solution was formed. This homogenous solution was kept inside muffled furnace which was maintained at 500° C. The voluminous combustion process conducted for 10 minutes resulted in reddish orange powder. This material is referred to as In5Ga8.

Example 6

Urea to Indium, Zinc and Gallium nitrates ratio was kept constant at 5. 90.4 wt %(10.70892 g) of Zinc nitrate hexa hydrate, 6.1 wt %(0.72192 g) of Indium nitrate hydrate, 3.45 wt %(0.4088 g) of gallium nitrate hydrate and 12 g of urea were dissolved in 10 ml of water and stirred constantly until homogenous solution was formed. This homogenous solution was kept inside muffled furnace which was maintained at 500° C. The voluminous combustion process conducted for 10 minutes resulted in fine dark orange powder. This material is referred to as In6Ga4.

Example 7

Urea to Indium, Zinc and Gallium nitrates ratio was kept constant at 5. 86.4 wt %(10.114 g) of Zinc nitrate hexahydrate, 10.5 wt %(1.2265 g) of Gallium nitrate hydrate, 3.1 wt %(0.361 g) of Indium nitrate hydrate and 12 g of urea were dissolved in. 10 ml of water and stirred constantly until homogenous solution was formed. This homogenous solution was kept inside muffled furnace which was maintained at 500° C. The voluminous combustion process conducted for 15 minutes resulted in fine dark orange powder. This material is referred to as In3Ga12.

Example 8

Urea to Indium, Zinc and Gallium nitrates ratio was kept constant at 5. 83.7 wt % (9.757 g) of Zinc nitrate hydrate, 13.15 wt %(1.53318 g) of Gallium nitrate hydrate, 3.1 wt %(0.361 g) of Indium nitrate hydrate and 12 g of urea were dissolved in 10 ml of water and stirred constantly until homogenous solution was formed. This homogenous solution was kept inside muffled furnace which was maintained at 500° C. The voluminous combustion process conducted for 10 minutes resulted in fine yellow powder. This material is referred to as In3Ga15.

Example 9

Photo Dehydrogenation of 2-Butanol 30 mg of the composite designated as In5Ga8 (as prepared in example 5) was suspended in 20 ml of reactant solution comprising 4 ml of 2-butanol and 16 ml of water. The suspended solution was taken in air tight 50 ml volume round bottomed flask. The mixture was irradiated for 2.5 hours under visible light source of 125 watts with NaNO2 as cut-off filter at 420 nm. To maintain constant room temperature during light irradiation, cool water was circulated in the outer jacket of the lamp holding glass reactor. After 2.5 hours the solution was filtered and the filtrated solution was subjected to product analysis. In the solution, an immiscible layer formation was observed on analysis of the nature of layers, indicating is the presence of water layer and organic layer of the product-2-butanone. The organic layer was separated using separating funnel.

Similarly the other compositions of the photostable composite were also experimented for photo dehydrogenation of 2-butanol.

Example 10

Hydrogen Generation from Water Splitting Containing Methanol as Sacrificial Agent 30 mg of the composite designated as In5Ga8 was suspended in 20 ml of reactant solution comprising 4 ml of methanol and 16 ml of water. The suspended solution was taken in air tight 50 ml volume round bottom flask. The solution was irradiated for 2.5 hours under visible light source of 125 watts with AM1.5 filter. To maintain constant room temperature during light irradiation, cool water was circulated in the outer jacket of the lamp holding glass reactor. After 2.5 hours the gases produced were collected by gas tight syringe and injected in GC with TCD detector. From the characteristic retention time for hydrogen, qualitative analysis was done and from the area under the peak quantitative analysis was done.

Example 11

Hydrogen Generation from Water Splitting without any Sacrificial Agents 20 mg of the composite designated as In5Ga8 was suspended in 40 ml of water and pH was adjusted to 4.5 by using $H_2SO_4$. No sacrificial agent was added to water. The suspended solution was taken in air tight 50 ml volume round bottomed flask and irradiated for 4 hours under illumination of 300 watts xenon lamp with AM 1.5 filters. The solar simulator system was built in such a way that constant temperature was maintained using cooling fans. The product gases were collected by gas tight syringe and injected in GC with TCD detector. From the characteristic retention for Hydrogen, qualitative analysis was done and from the area under the peak quantitative analysis was done. Similarly the other compositions were also evaluated for Hydrogen generation from water splitting without any sacrificial agent.

Example 12

Hydrogen Generation from Water Splitting Under Visible Light Irradiation of Incident Wavelength at 455 nm and Above 20 mg of the composite catalyst designated as In5G8 was suspended in 40 ml of water and pH was adjusted to 4.5 No sacrificial agent was added into the reactant. The suspended solution was irradiated for 4 hours under the illumination of 300 watts xenon source using a cut-off filter for incident wavelength ≥455 nm. After irradiation, the product gases were collected and analyzed in GC with TCD detector. From the characteristic retention for Hydrogen, qualitative analysis was done and from the area under the peak quantitative analysis was done. Similarly the other compositions were evaluated for Hydrogen generation from water splitting without any sacrificial agent or co-catalyst.

Advantages of the Invention

1. The present invention provides a simple, reproducible process for preparation of photo stable, single phase solid solution of Indium Gallium nitride in ZnO without Gallium oxide and Indium oxide as impure phases.
2. The composite material retains wurtzite structure with high degree of crystallinity.
3. The composite material in solid solution form is photostable, thermally stable and shows enhanced absorption covering entire visible light and UVA+UVB regions of solar spectrum.
4. Indium Gallium nitride embedded quantum dots in ZnO serve as light harvester for solar hydrogen production from water splitting and eliminates the need for use of sacrificial agent or co-catalyst.
5. Indium Gallium nitride embedded quantum dots in ZnO serve as solar cell materials to produce photocurrent with visible light, and even at low energy (high wavelength) photons.

We claim:
1. A photostable composite of an Indium gallium nitride (InGaN) in a ZnO, comprising an Indium (In) content in a range of 1-40 wt %, a Gallium (Ga) content in a range of 1 to 15 wt %, a nitrogen (N) content in a range of 0.1 to 5 wt %, and a remaining content in wt % of the photostable composite is the ZnO,
wherein the Indium gallium nitride (InGaN) is in a form of a solid solution as embedded quantum dots in the ZnO, which serves as a light harvester for solar hydrogen production from water splitting without the use of any sacrificial agent or a co-catalyst and in other photocatalytic reactions,
wherein the nitrogen present is in a form of nitride.
2. The photostable composite of claim 1, wherein the photostable composite exhibits absorption in an entire solar spectrum.
3. The photostable composite of claim 1, wherein the photostable composite exhibits hydrogen evolution in a range of 5 to 65 µmol/h g.
4. The photostable composite of claim 1, wherein the nitrogen is substitutionally doped in oxygen site in the ZnO lattice of the photostable composite.

* * * * *